(12) United States Patent
Starodubov et al.

(10) Patent No.: US 10,550,028 B2
(45) Date of Patent: Feb. 4, 2020

(54) FIBER OPTIC MANUFACTURING IN SPACE

(71) Applicant: FOMS Inc., San Diego, CA (US)

(72) Inventors: Dmitry Starodubov, Woodland Hills, CA (US); Leo Volfson, Del Mar, CA (US)

(73) Assignee: FOMS Inc., San Diego, CA (US)

( * ) Notice: Subject to any disclaimer, the term of this patent is extended or adjusted under 35 U.S.C. 154(b) by 0 days.

(21) Appl. No.: 16/260,040

(22) Filed: Jan. 28, 2019

(65) Prior Publication Data

US 2019/0152835 A1   May 23, 2019

Related U.S. Application Data

(63) Continuation-in-part of application No. 15/968,958, filed on May 2, 2018, now Pat. No. 10,189,737,
(Continued)

(51) Int. Cl.
*G02B 6/02* (2006.01)
*C03B 37/025* (2006.01)
(Continued)

(52) U.S. Cl.
CPC ........ *C03B 37/0253* (2013.01); *C03B 37/029* (2013.01); *C03B 37/032* (2013.01); *C03C 25/106* (2013.01); *C03C 25/12* (2013.01); *G02B 6/02395* (2013.01); *C03B 2201/12* (2013.01); *C03B 2201/82* (2013.01);
(Continued)

(58) Field of Classification Search
CPC .. G02B 6/02395; G02B 6/443; G02B 6/4433; G02B 6/26; G02B 6/02
See application file for complete search history.

(56) References Cited

U.S. PATENT DOCUMENTS

| 3,592,628 A | 7/1971 | Wuenscher |
| 4,932,740 A | 6/1990 | Berkey et al. |

(Continued)

FOREIGN PATENT DOCUMENTS

| EP | 1112979 B1 | 6/2004 |
| JP | S60260440 A | 12/1985 |

(Continued)

OTHER PUBLICATIONS

"Low-Loss ZBLAN Glass and Fiber Fabrication in Low Gravity", accessed at: https://www.sbir.gov/print/sbirsearch/detail/384437 on Jan. 31, 2018, 2 pages.
(Continued)

*Primary Examiner* — Jennifer Doan
(74) *Attorney, Agent, or Firm* — Alliance IP, LLC

(57) ABSTRACT

Aspects of the embodiments include an optical fiber formed in a low gravity environment. The optical fiber can be used in airframe applications for missile defense, oil-field applications for down-well laser applications, optical communications, and other applications. The optical fiber can include a fluoride composition, such ZrF4-BaF2-LaF3-AlF3-NaF (ZBLAN), and can be characterized by an insertion loss in a range from 13 dB/1000 km to 120 dB/1000 km. The optical fiber can deliver optical energy with low insertion loss at the desired power and wavelength for the various applications.

13 Claims, 8 Drawing Sheets

Related U.S. Application Data which is a continuation of application No. 15/432,817, filed on Feb. 14, 2017, now Pat. No. 9,988,295.

(60) Provisional application No. 62/295,478, filed on Feb. 15, 2016.

(51) Int. Cl.
| | | |
|---|---|---|
| *C03C 25/12* | (2006.01) | |
| *C03C 25/106* | (2018.01) | |
| *C03B 37/03* | (2006.01) | |
| *C03B 37/029* | (2006.01) | |

(52) U.S. Cl.
CPC ...... *C03B 2205/04* (2013.01); *C03B 2205/30* (2013.01); *C03B 2205/40* (2013.01); *C03B 2205/62* (2013.01); *C03B 2205/67* (2013.01); *C03B 2205/72* (2013.01); *C03B 2205/74* (2013.01); *Y02P 40/57* (2015.11)

(56) References Cited

U.S. PATENT DOCUMENTS

| | | | |
|---|---|---|---|
| 5,162,861 A * | 11/1992 | Tamburino | G01C 3/08 348/319 |
| 7,164,835 B2 | 1/2007 | Matsuo et al. | |
| 7,848,606 B1 | 12/2010 | LaPointe et al. | |
| 7,930,904 B2 | 4/2011 | Bookbinder et al. | |
| 9,285,535 B2 * | 3/2016 | Jain | G02B 6/02052 |
| 9,418,457 B1 | 8/2016 | Glover | |
| 2003/0024272 A1 | 2/2003 | Naka et al. | |
| 2003/0202763 A1 | 10/2003 | Starodubov | |
| 2014/0066144 A1 | 3/2014 | Hong | |
| 2014/0069144 A1 | 3/2014 | Aoki et al. | |
| 2014/0353682 A1 | 12/2014 | Seng et al. | |
| 2015/0104138 A1 | 4/2015 | Johnson et al. | |
| 2015/0266767 A1 | 9/2015 | Glover et al. | |
| 2015/0285994 A1 | 10/2015 | Okada | |

FOREIGN PATENT DOCUMENTS

| | | |
|---|---|---|
| JP | S63117922 A | 5/1988 |
| JP | H01275446 A | 11/1989 |
| JP | 05246734 | 9/1993 |
| JP | 2003048738 A | 2/2003 |
| JP | 2006030478 A | 2/2006 |
| WO | 2017142963 A1 | 8/2017 |

OTHER PUBLICATIONS

Dooling, Dave, "ZBLAN Continues to show promise," NASA Science Beta, Feb. 5, 1998, available online at <https://science.nasa.gov/science-news/science-at-nasa/1998/msad05feb98_1> (10 pages).

PCT International Preliminary Report on Patentability in International Application No. PCT/US2017/017997 dated Aug. 21, 2018.

PCT International Search Report and Written Opinion in PCT International Application Serial No. PCT/US2017/017997 dated May 15, 2017.

Starodubov, Dmitry et al., "ZBLAN Fibers: From Zero Gravity tests to Orbital Manufacturing," Imaging and Applied Optics, OSA 2014 (2 pages).

Torres, Anthony, "Enhanced processability of ZrF4-BaF2-LaF3-AlF3-NaF glass in microgravity," Proceedings vol. 8704, Infrared Technology and Applications XXXIX, 87042c (2013) doi: 10.1117/12.2018308, SPIE Defense, Security and Sensing, 2013, Baltimore, Maryland, United States, Published Jun. 18, 2013.

Tucker, Dennis et al., "Eliminating Crystals in Non-Oxide Optical Fiber Preforms and Optical Fibers", Recent Patents on Space Technology 2.2 (2012): 108-115. Publication Date Jan. 1, 2012.

Tucker, Dennis et al., "Reduced Gravity ZBLAN Optical Fiber", American Institute of Aeronautics and Astronautics, AI Paper 2000-0945, Publication Date Jan. 1, 2000.

EPO Extended European Search Report issued in EP Application No. 17753768.5, dated Aug. 21, 2019; 6 pages.

Japan Patent Office; Office Action issued in JP Patent Application No. 2018-561925; dated Jul. 30, 2019; 9 pages including English translation.

* cited by examiner

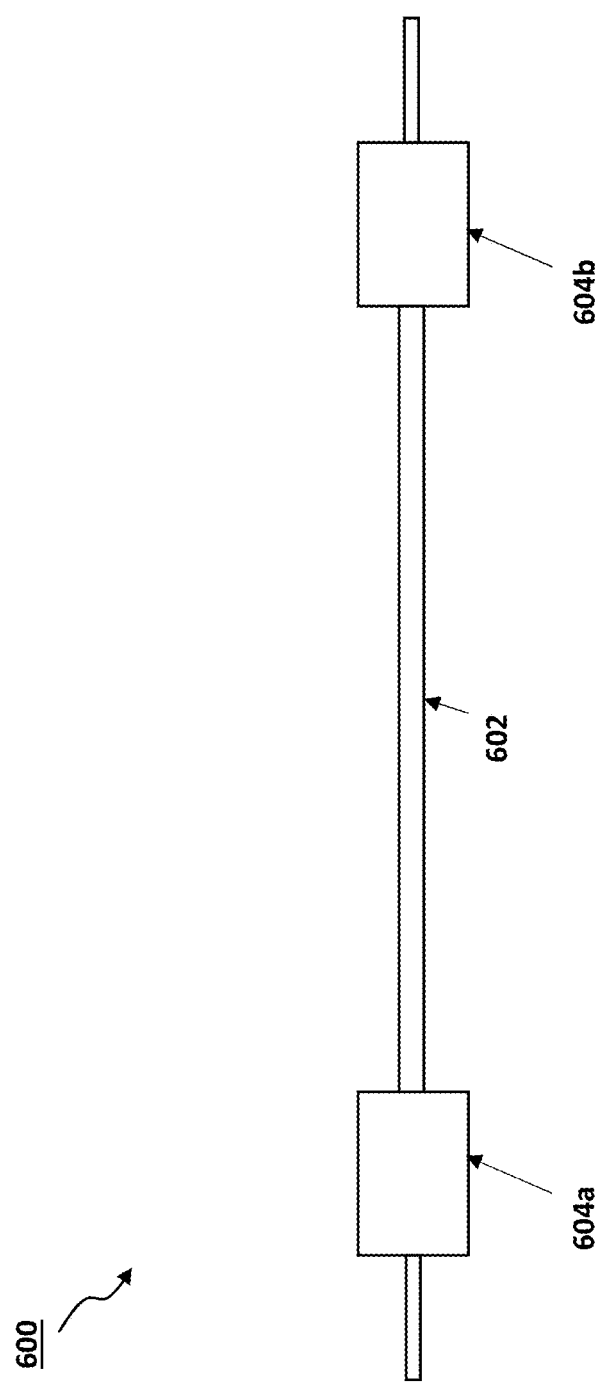

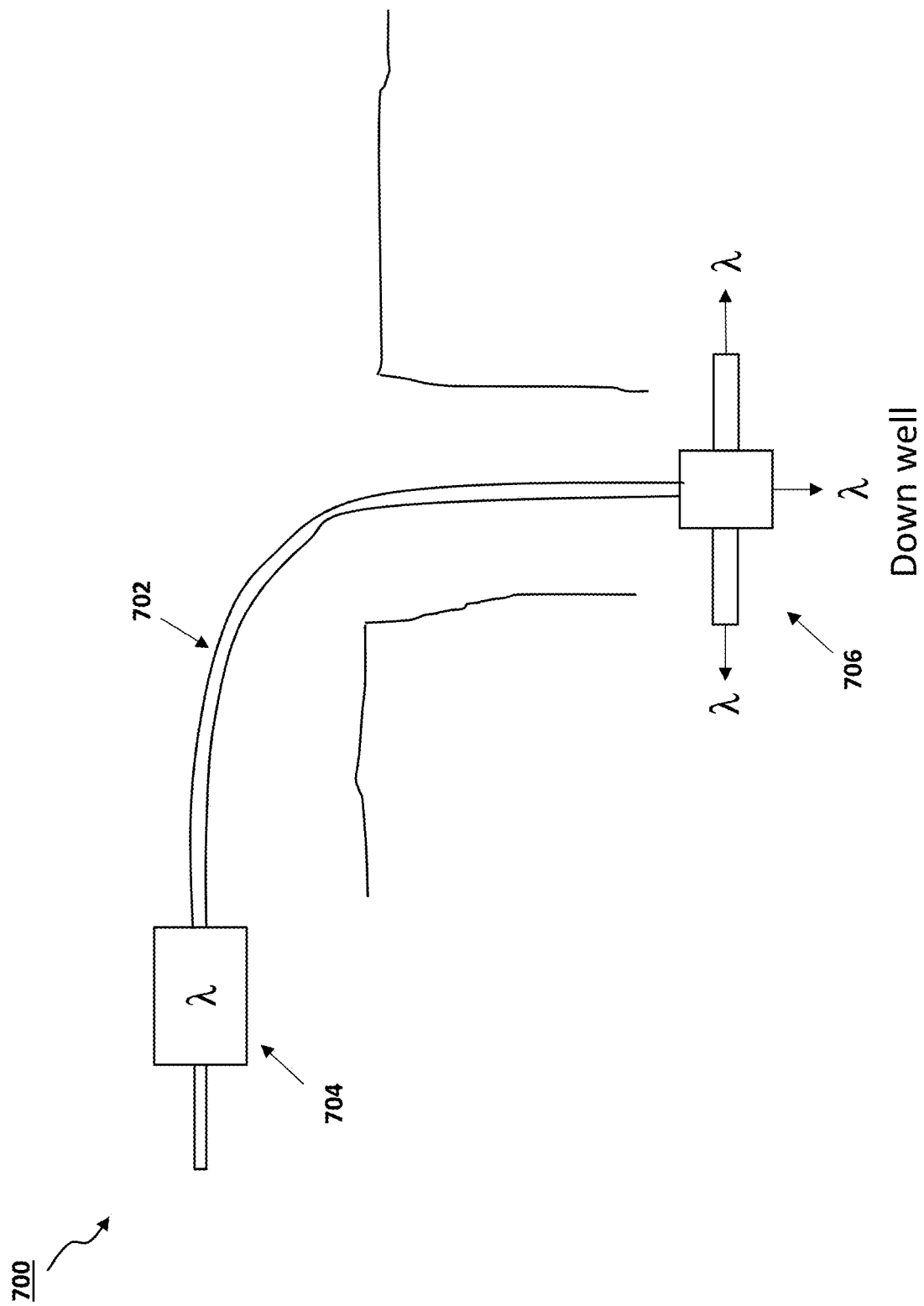

FIBER OPTIC MANUFACTURING IN SPACE

CROSS REFERENCE TO RELATED APPLICATION

This application is a continuation-in-part, and claims the benefit of priority to U.S. patent application Ser. No. 15/968,958 filed on May 2, 2018, and entitled FIBER OPTIC MANUFACTURING IN SPACE, which application is a continuation of U.S. patent application Ser. No. 15/432,817 filed on Feb. 14, 2017, issued as U.S. Pat. No. 9,988,295 on Jun. 5, 2018, which application claims the benefit of priority to U.S. Provisional Patent Application Ser. No. 62/295,478, filed on Feb. 15, 2016 and entitled, "Fiber Optic Manufacturing in Space,". The disclosures of the prior applications are hereby incorporated by reference in their entirety herein.

TECHNICAL FIELD

This disclosure pertains to fiber optic manufacturing in space, and apparatuses and methods for achieving the same.

BACKGROUND

An optical fiber (or fibre) is a flexible, transparent fiber, often made of glass (silica) or plastic. Optical fibers are used to transmit light between the two ends of the fiber, and have practical applications in the fields of fiber-optic communications, where they permit transmission over longer distances and at higher bandwidths (data rates) than wire cables. Optical fibers exhibit low attenuation characteristics and low electromagnetic interference, as compared to metal wires. Therefore optical fibers can accommodate higher bandwidth, as mentioned, and/or longer transmission distances. Optical fiber has other uses, such as in laser applications, imaging applications, and lighting applications.\

SUMMARY

Aspects of the embodiments are directed to a system for delivering optical energy through an optical fiber formed in a low gravity environment, the system comprising a laser source; an optical aperture; and the optical fiber formed in the low gravity environment coupling the laser source to the optical aperture.

In some embodiments, the optical fiber comprises an insertion loss less than or equal to 0.02 dB per km at an operating wavelength longer than 1.7 microns.

In some embodiments, the optical aperture resides at one or more locations on an airframe.

In some embodiments, the laser source is to emit laser light at a power in a range from 1 watt to 100 watts.

In some embodiments, the laser source is to emit a laser at a wavelength within a range from 1.7 microns to 7 microns through the optical fiber.

In some embodiments, the optical aperture is configured for down-well applications.

In some embodiments, the laser source is to emit laser light at a power in a range from 1 kilowatt to 100 kilowatts.

In some embodiments, the laser source is to emit a laser at a wavelength within a range from 1.7 microns to 4 microns through the optical fiber.

In some embodiments, the system can include an optical communication system.

In some embodiments, the optical fiber comprises an insertion loss less than or equal to 0.15 dB/km at an operating wavelength in a range from 2-4 microns.

Aspects of the embodiments are directed to a method for forming an optical fiber in a low gravity environment. The method can include providing a preform in a preform drawing apparatus in the low gravity environment; engaging the preform with a spool under an initial temperature; turning the spool until a desired tension on the preform has been reached; increasing the temperature of the preform until a desired spool speed is reached; and locking the temperature of the preform.

Aspects of the embodiments are directed to an optical fiber drawn in a low gravity environment. In some embodiments, the optical fiber comprises fluoride, such as ZrF4-BaF2-LaF3-AlF3-NaF (ZBLAN). In some embodiments, the optical fiber comprises an insertion loss in a range from 13 dB per 1000 km to 120 dB per 1000 km.

BRIEF DESCRIPTION OF THE DRAWINGS

FIG. 6 is a schematic diagram of a data transmitter using an optical fiber in accordance with embodiments of the present disclosure.

FIG. 7A is a schematic diagram of an example energy delivery system in accordance with embodiments of the present disclosure.

DETAILED DESCRIPTION

Figure 1:
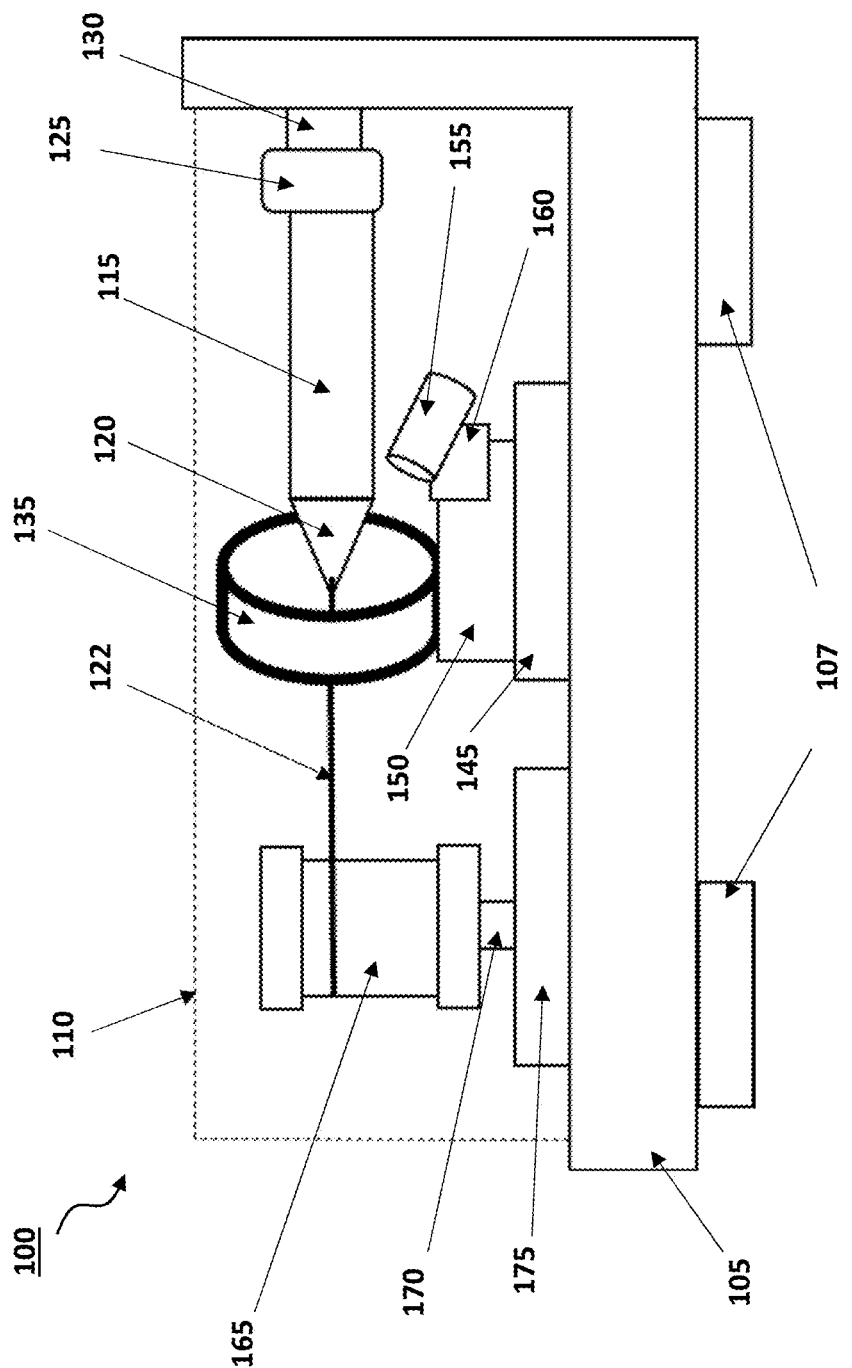
FIG. 1 is a schematic diagram of an example apparatus for material processing in low in accordance with embodiments of the present disclosure.

This disclosure describes an optical fiber that is formed in low gravity environments, such as aboard space-borne vehicles or platforms, and methods and devices for making optical fibers in low gravity environments. In this disclosure, the term "low gravity" can includes gravitational forces wherein $g \leq 10^{-2}$ G for two or more minutes. An example space-borne vehicle/platform can include the International Space Station (ISS), other orbital platforms, or orbital vehicles.

Optical fibers made from glasses with low insertion loss in infrared spectral range, such as fluoride-based optical fibers, including ZBLAN (ZrF4-BaF2-LaF3-AlF3-NaF), have the potential to enhance optical communications beyond that of conventional fused silica based optical fibers. For example, non-fluoride-based optical fibers made from fused silica are currently approaching the theoretical limit of insertion loss of 0.14 dB/km or 140 dB per 1000 km, with actual insertion loss under 200 dB per 1000 km. ZBLAN optical fibers have been characterized as having a theoretical minimum insertion loss of 13-22 dB per 1000 km. ZBLAN optical fibers, however, can undergo errant crystallization and detrimental phase separation during fabrication, and these factors of crystallization and phase separation can inhibit reaching the theoretically low loss. These crystallization and phase separation phenomena are suppressed in low gravity environments. This disclosure describes systems and methods for manufacturing optical fibers that can achieve the insertion loss in the infrared spectrum of less than 0.12 dB/km in its undoped form.

The low insertion loss of ZBLAN optical fiber in combination with a unique transparency window from UV down to mid-IR wavelengths makes this fluoride-based optical fiber a strong candidate for broadband spectral signature recording, environmental monitoring, mid-IR fiber lasers for medical and military needs with a potential of reducing the transmission loss by an order of magnitude compared to the best existing telecommunication fibers that would revolutionize optical communications.

Due to its high value-to-mass ratio and unique enhancements in zero gravity the optical fiber production shows promise for a commercially attractive process for the orbital platform. This disclosure describes forming ZBLAN (ZrF4-BaF2-LaF3-AlF3-NaF) optical fibers (and/or optical fibers having similar properties as ZBLAN optical fiber) in low gravity.

Material Processing Apparatus for Low Gravity Environment

The low gravity environment, such as the microgravity environment of orbital space flight, can change a number of chemical, physical, biological and other processes that are widely used in various processes in normal gravity environment on Earth. A good illustration of a difference in processing that occurs between low gravity and normal gravity is a process of burning. A round shape and uniform glow form when burning in low gravity due to lack of convection process (i.e., when hot air moves up and shapes up the flame). One of the implications of such a difference is the possibility to use the low gravity orbital environment for manufacturing processes that are not possible on Earth. Additionally, low gravity environments can foster the elimination of bouncy differences in multicomponent material systems, such as multicomponent glasses or crystals with defects, resulting in better material uniformity during the processing and allowing to obtain unique material properties that may not be available on Earth. Examples of the manufacturing processes are the glass fiber drawing and crystal processing including defect elimination and crystal growth. The present disclosure describes the apparatus and the process details that allow the optimal utilization of the microgravity environment.

FIG. 1 is an apparatus 100 for material processing in low in accordance with embodiments of the present disclosure. The apparatus 100 is mounted on a support 105 that provides structural integrity of the apparatus 100. The support has a mount 107 for attaching the apparatus during launch of the rocket to the space platform during operation in space. An optimal platform for volume low gravity processing is an orbital station such as International Space Station. The design of the mount 107 establishes reliable mechanical connection and can be also used to reduce (damp) the vibration transfer from the mounting location. The apparatus has a shield 110 that provides isolation of the apparatus from the space environment during operation and rocket environment during the preparation for launch and during trip on a rocket to space. The shielding 110 allows the establishment of a processing-specific environment for the apparatus. An example of such an environment is low pressure environment. Another example of such environment is gas fill such as formic gas with hydrogen content and without oxygen that prevents oxidation or chlorine gas that suppresses water related reactions. Another example is the dry air environment with reduced water vapor content.

A material sample 115 is placed inside the apparatus for processing in low gravity. The example of such material is a multicomponent glass such as fluoride glass composition, for example ZBLAN glass with a composition ZrF4-BaF2-LaF3-AlF3-NaF. This material sample 115 (also referred to as a preform) can be coated with protective material such as fluoride polymer, such as Teflon. Preferably the softening temperature of the coating material such as polymer is lower than the processing temperature of the glass preform. Another example of such material sample 115 is a crystal, for example gallium nitride or silicon carbide crystals that can be in a form of a wafer and may have defects. The section (zone) of the material sample 120 represents the portion of the sample that undergoes transformation. The transformation example is the draw of the optical fiber from the fiber preform under applied heat that softens the preform. Another example of the transformation is crystal properties change and the transition zone 120 is the section of the sample where for example crystallization or re-crystallization occurs. In another configuration the section 120 is the section of the crystal where the defects of the crystalline structure are removed during the processing in low gravity. In another configuration for zone melting this section is molten material zone that drives the impurities from the sample. The transformed material 122 is the continuation of the material sample past the transformation portion. In the case of fiber draw the transformed material results in optical fiber. In case of crystal growth, the transformed material is crystal. In case of crystal with defects processing the transformed material is the crystal with low amount of defects. In case of zone melting this is processed material with low amount of impurities. The material sample 115 is mounted with a preform holder 125. The mount could be a sample holder with alignment elements that provide the orientation adjustment and positioning of the material sample 115 for optimal processing. The preform holder 125 may have a locking mechanism for protection of the material sample 115 during the delivery of apparatus 100 to the low gravity environment. The preform holder 125 is attached to the support 105 with the interface 130. This interface 130 can have a tension load cell that facilitates monitoring of the material transformation.

A transformation actuator 135 facilitates the transition of material 115 to the resulting material 122. Most common example of the actuator is a heating oven. Alternatively the actuator could be a laser. An additional alignment element that can align the position of the fiber preform 115 relative to the actuator 135 could be mounted on the actuator 135. This alignment element can be a centering fixture to keep the preform 115 in the center portion of the oven without touching the oven walls. The transformation actuator 135 is mounted on support 150. The support 150 can include a mechanism to adjust transformation actuator 135. For example, the support can adjust the position of the heating oven over the transition zone 120 for optimal transformation. The sensor element 155 is mounted on the support 150 with attachment element 160 that may also have adjustment capability. The sensor element 155 is used to monitor the transition zone 120. This monitoring can be done within the transformation actuator 135 to control the transition process through adjustment of transformation actuator 135 performance. The transformation actuator 135 could be a temperature measurement device, for example a thermal camera or a remote thermometer with a laser pointer. The mounting interface 145 is used to attach the support 150 to the support 105. The mounting interface 145 can contain the translation stage for moving the transformation actuator 135 along the length of material 115 to facilitate the transformation along the element 115.

The spool 165 serves as collecting element for collecting the transformed material 122. This spool 165 can be a fiber spool in case of a fiber draw. In one embodiment this fiber spool 165 can prevent the collected fiber 122 from de-spooling in case of breaking of the fiber 122. The spool 165 is a crystal holding container in case of the crystal growth. The spool 165 is attached to the mounting interface 175 with the holding element 170. The holding element 170 could be a spooling mechanism that rotates the spool 165 for winding the resulting fiber 122. The mounting interface 170 could be a translation stage that provides uniform winding of the fiber across the spool.

The apparatus 100 as a whole could be made in a form of a processing container. Alternatively the set of elements of apparatus 100 could be made in a form of a container similar to a cassette for travelling up to low gravity environment and back while the remaining set of parts of apparatus 100 are staying stationary in low gravity environment similarly to cassette deck that accepts the cassette (or multiple cassettes), plays the cassette for material transformation. After the processing the cassette portion of the apparatus 100 is returned back to Earth for orbital material use.

Figure 2:
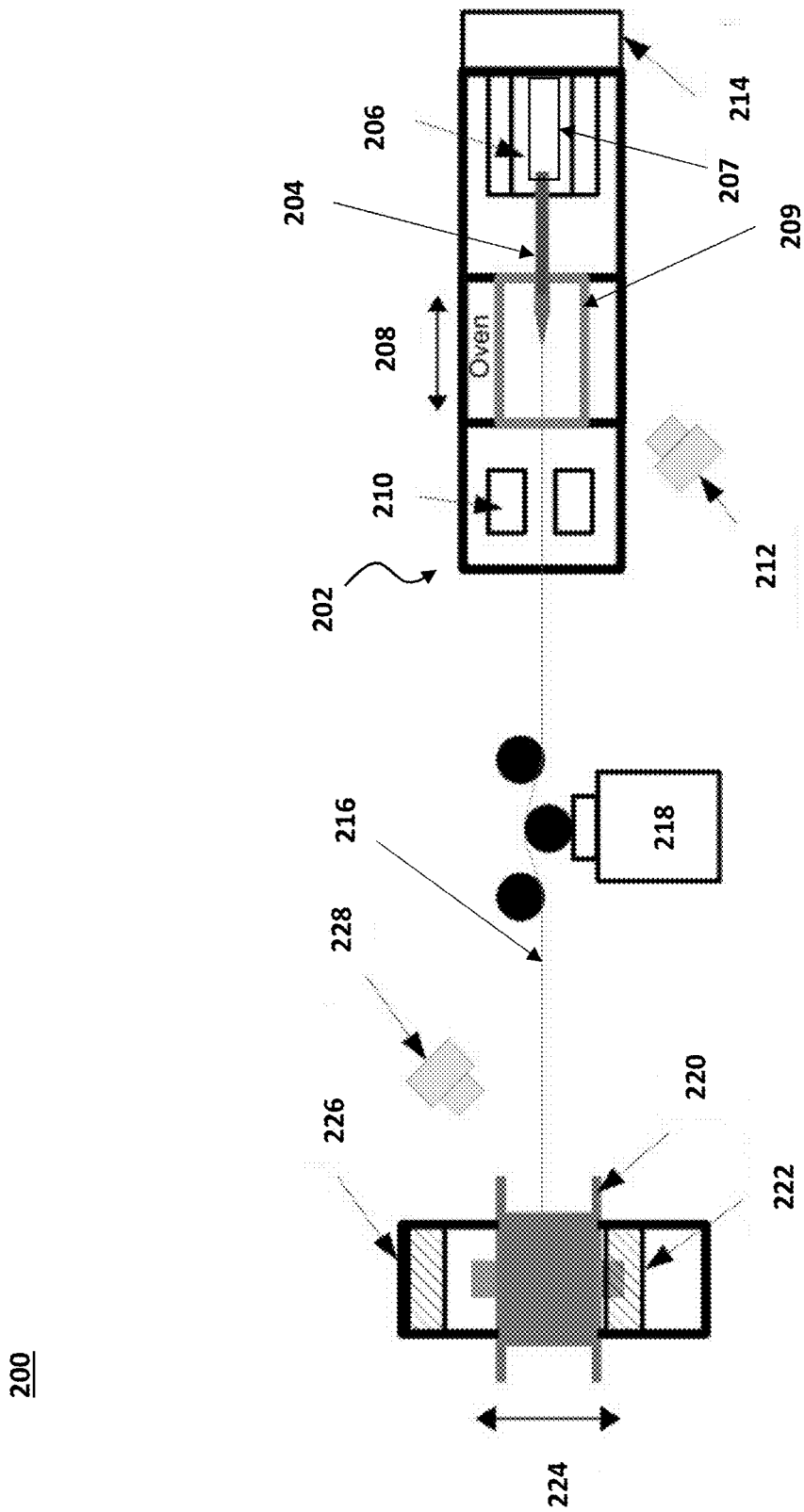
FIG. 2 is a schematic diagram of another example apparatus for material processing in low in accordance with embodiments of the present disclosure.

FIG. 2 is a schematic diagram of another example fiber draw apparatus 200 for low gravity environment in accordance with embodiments of the present disclosure. Apparatus 200 is similar to apparatus 100. Apparatus 200 includes a preform container 202. Preform container 202 includes a preform holder 206 that holds a preform 204. Preform 204 can be a fluoride-based material for forming fluoride-based optical fiber 216. In one example, the preform 204 can be a ZBLAN preform.

The preform container 202 can include an oven stage 208. The oven stage 208 can be coupled to an oven stage motor 214. Oven stage motor 214 can be controlled to move the oven stage 208 along the length of the preform 204 as the preform 204 shortens due to being drawn into fiber 216. The oven stage motor 214 can be driven by a controller (shown in more detail in FIG. 3) that uses certain inputs to control the speed of the oven stage 208 translation. The controller can also control the temperature of the oven. The oven stage motor 214 can also be controlled based on information from a profile sensor 210 and/or an oven camera 212. The oven camera 212 records the tip of the preform condition in the transformation zone. The preform 204 can be further illuminated from the back side with the light source such as light emitting diode (LED) or the laser. The image of the preform tip inside the oven 209 is used to detect crystallization and the defects of non-uniformity that produce light scattering. The fabrication process parameters are optimized for having minimal amount of defects using the oven camera image. The oven stage motor 214 can also control the spooling of the fiber 216, as described further below.

The apparatus 200 also includes a tension sensor 218 that monitors the tension of the fiber 216 prior to spooling. The tension sensor 218 can provide an input to the controller to control one or more parameters, such as the oven stage motor control. In apparatus 200, a tension sensor 218 is shown between the preform 204 and the spool 220. A tension sensor 207 can also (or in the alternative) reside on the preform holder 206 to contact the preform 204.

In embodiments, the oven temperature can be fixed. The measured tension of the draw is used to control the oven stage motor 214. Therefore, the speed of the spool 220 controls the speed of the oven stage 208. By allowing the spool 220 to control the speed of the oven stage 208, the diameter of the fiber 216 is controlled by the ratio of the speed of the spooling relative to the movement of the oven stage 208. At the outset, the spool 220 can be engaged to provide an initial tension on the exposed preform 204. A controller (of FIG. 3) can control a spool tension motor 222 to create a draw tension. The controller can stop the spool tension motor 222 from rotating the spool after a target draw tension is reached, as indicated by tension sensor 207, while maintaining the draw tension on the fiber 216. When the target tension is reached, the oven 209 can be activated to heat the preform 204. The oven temperature can be gradually increased until a desired spool speed is reached. The fiber 216 will begin to draw when the preform 204 reaches a minimum draw temperature. This temperature is defined by the minimum temperature needed to soften the preform 204 such that the fiber 216 can be drawn from the preform 204 at the target tension. Since the spool 220 is under a torque load by the spool tension motor 222, the spool 220 will rotate to draw the fiber 216.

In embodiments, the draw tension and the draw temperature can be independently optimized. For example, a high temperature and low draw tension can increase optical fiber purity and decrease the likelihood of additional strain placed on the fiber during drawing. Additionally, the diameter of the optical fiber 216 can also be independently controlled by optimizing the ratio of the spool speed to the oven stage movement speed. One advantage of drawing the optical fiber in a low gravity environment is that the change in the weight of the preform 204 does not need to be monitored.

The spool tension motor 222 includes a safety limiter that limits the torque that the motor can apply on the spool 220. The safety limiter can prevent the spool tension motor 222 from over-driving the spool 220 and breaking the fiber 216.

In embodiments, the coating material can be on the preform 204 prior to heating. In embodiments, the oven stage 208 can include a coating material holder 210 that can hold coating materials, such as Teflon. The coating materials can be heated in oven 208 during the fiber draw. The coating material holder 210 can be coupled to the oven stage 208 to move with the oven stage 208 by oven stage motor 214. Adding the coating, such as Teflon, to the fiber during formation can be performed in a manner similar to that described in U.S. patent application Ser. No. 10/131,970, titled, "Method for forming a protective coating on an optical fiber," filed on Apr. 24, 2002, the entire contents of which are incorporated by reference.

The apparatus 200 also includes a spool linear stage 224 and a spool stage motor 226. The spool linear stage 224 can be moved by the spool stage motor 226 to allow the spool 220 to wind the drawn fiber 216 around the spool 220.

Figure 3:
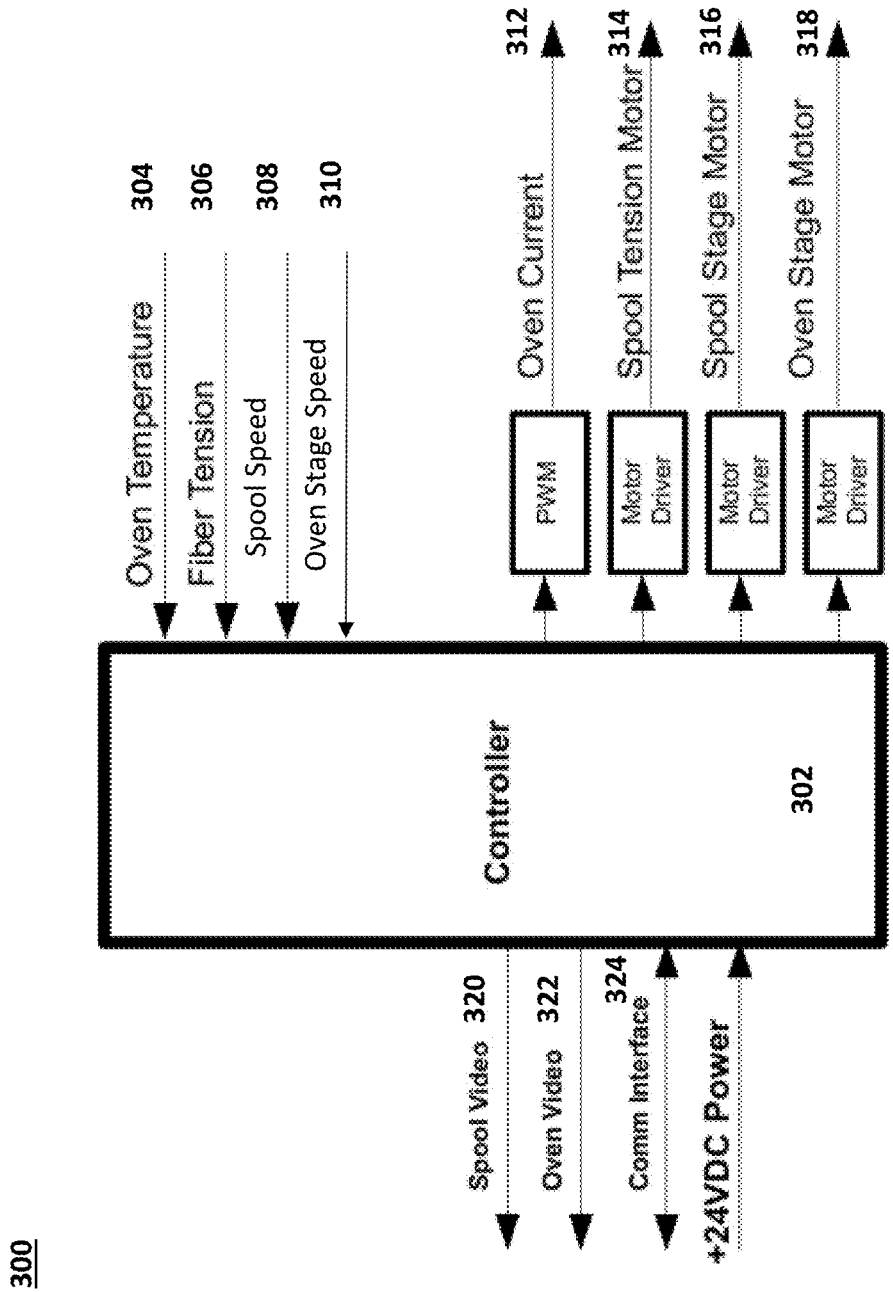
FIG. 3 is a schematic diagram of a controller for fabrication of the optical fiber in low gravity environment in accordance with embodiments of the present disclosure.

FIG. 3 is a schematic of a control system 300 for fabrication of the optical fiber in low gravity environment in accordance with embodiments of the present disclosure. The control system can include a microcontroller 302. Microcontroller 302 can be a microprocessor or other computing element that is able to control various motors of the apparatus 100 or 200 based on certain inputs. For example, the microcontroller 302 can receive as an input oven temperature 304 from an oven thermometer, fiber tension 306 from a tension sensor, and a spool speed 308 from a spool tension motor, and an oven stage speed 310 from the oven stage motor.

Figure 4:
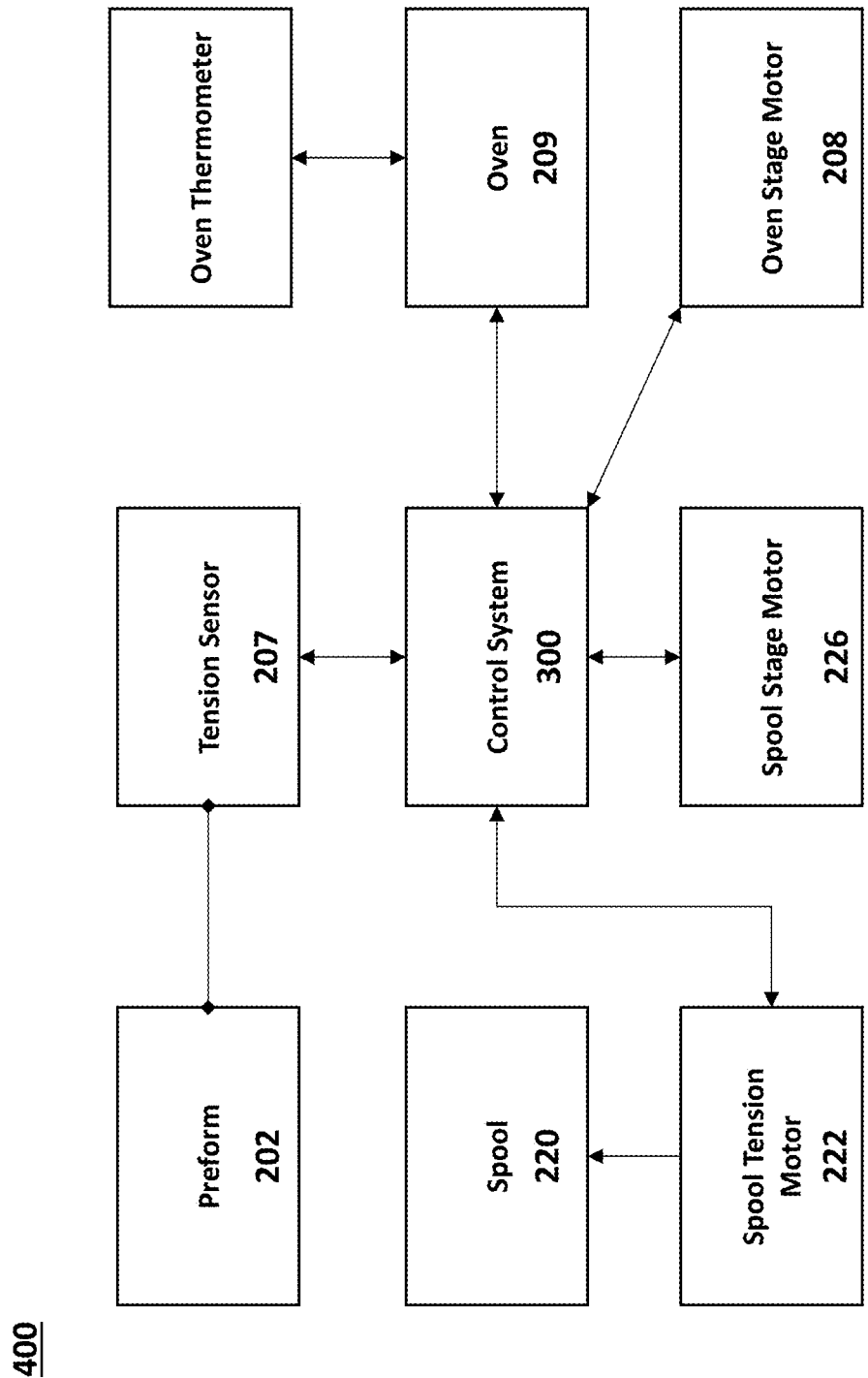
FIG. 4 is a schematic diagram of a logical diagram for an optical fiber drawing apparatus in accordance with embodiments of the present disclosure.

FIG. 4 is a schematic diagram of a logical diagram 400 for an optical fiber drawing apparatus in accordance with embodiments of the present disclosure. The logical diagram 400 illustrates example logical communication paths between various aspects of a low gravity optical fiber drawing apparatus (such as apparatus 100 or apparatus 200). The control system 300 can be communicably coupled to a tension sensor (such as tension sensor 207), an oven 209 (or, more specifically, an oven thermometer to control oven temperature), a spool tension motor 222 (to control the tension of the fiber), an oven stage motor 208 (to control the movement of the oven 209 relative to the preform 202), and a spool stage motor 226 (to control translation of a spool stage to accommodate winding of the optical fiber across the spool).

Figure 5:
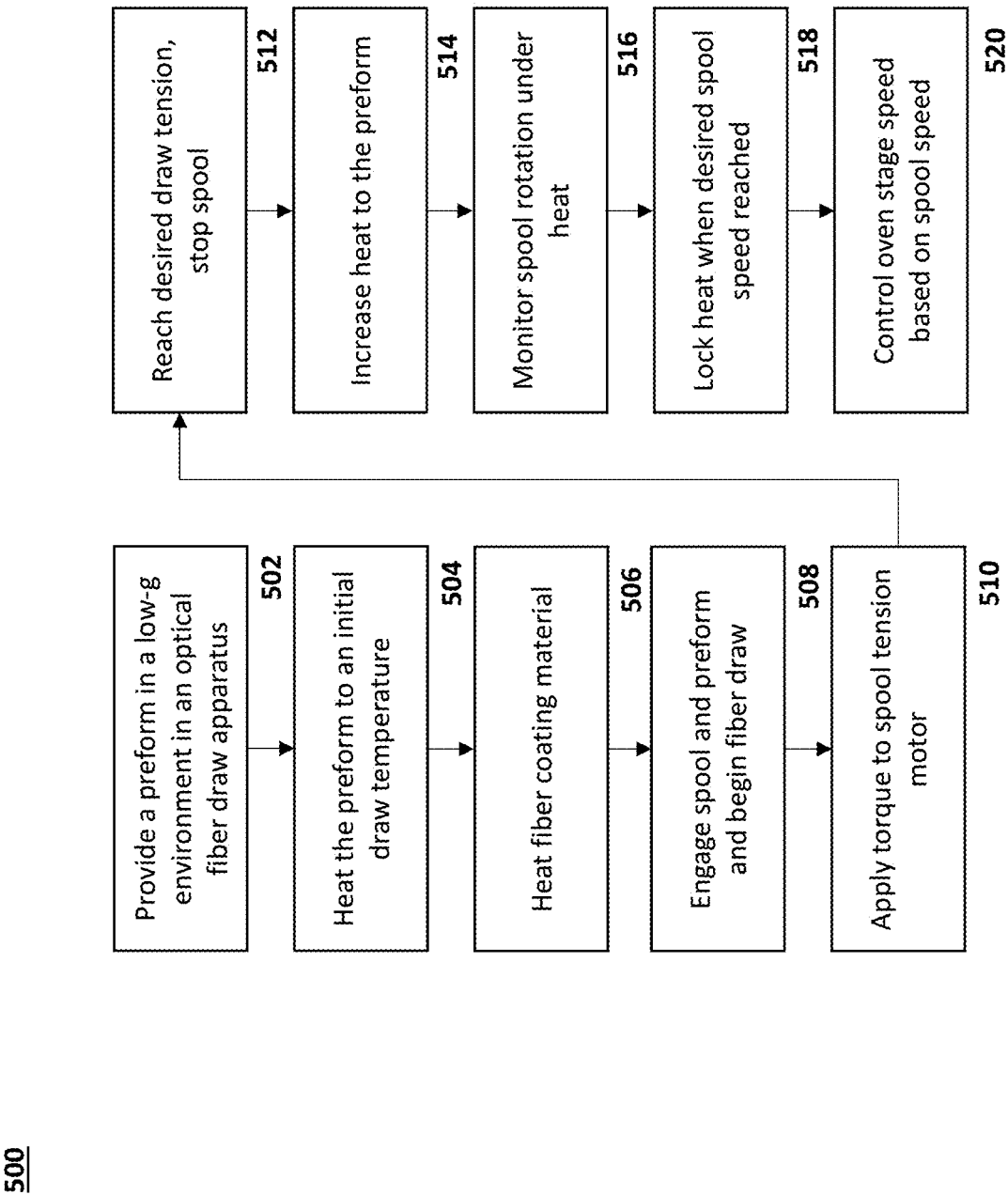
FIG. 5 is a process flow diagram for drawing an optical fiber in low gravity environments in accordance with embodiments of the present disclosure.

FIG. 5 is a process flow diagram 500 for drawing an optical fiber in a low gravity environment in accordance with embodiments of the present disclosure. At the outset, the preform can be provided in a low gravity environment, such as an orbital platform or orbital vehicle (502). During transport to the orbital platform or vehicle, the preform (in a preform holder) and the spool are locked in place. When ready for operation, the interlocks can be disengaged. The preform can be heated to a predetermined initial temperature to soften the preform for engagement to a spool (504). A coating material can also be heated (506), and the coating covers the drawn fiber. The preform can then be engaged with the spool for drawing (508). A torque can be applied to the spool to pull the fiber and apply an initial tension on the preform (510). While the torque is applied, the spool will turn until a desired tension is met (512). The spool will stop turning at when the desired tension is met. The controller can then gradually apply heat to the preform (e.g., by the oven) to further soften the preform and cause the spool to turn as the preform softens (514). The spool speed is monitored under a constant tension and increasing heat until a desired spool speed is reached (516). Once the desired spool speed is reached, the heat is locked (518). The spool speed can be used to control the oven stage motor to move the oven stage as the preform/fiber interface changes (520). For example, for a desired fiber diameter, a ratio of spool speed to oven stage movement speed can be determined. The process can continue until the preform has been exhausted. In embodiments, the tension, oven temperature, spool speed, and oven stage speed can be changed for a single preform to obtain optical fibers with different characteristics.

In a first example, embodiments of the present disclosure can include an apparatus that includes a preform material held in place by a preform holder. The preform can include a glass or crystal material and can be covered by a coating. The apparatus also includes a transform apparatus (e.g., an oven) residing adjacent to the preform holder, wherein the preform can reside at least partially in the oven. The transform apparatus can be on a moveable stage (moveable relative to the preform holder). The transform apparatus is configured to heat the preform to a level to facilitate transformation of the preform into a fiber material having a different material composition than the starting preform. The apparatus also includes a shield or cover that can create an air-tight chamber that houses the preform holder, the transform apparatus, and other components.

In some embodiments, the apparatus includes a spool to wind the fiber material.

In some embodiments, the apparatus includes a load cell coupled to the preform holder to measure the tension placed on the preform and the fiber as it spools.

In some embodiments, the apparatus can be housed in a cassette form factor housing.

In some embodiments, the apparatus includes a thermal camera to monitor the preform cone temperature.

In some embodiments, the apparatus includes a surfacing coating implementing device that allows for the fiber to be drawn with a coating, such as a high fluorine material, such as a Teflon coating.

Optical fiber fabrication in space can be a costly process that includes the delivery of the preform mass to the space platform and subsequent recovery of the resulting optical fiber on the ground. The environmental sensitivity of the low loss infrared materials, such as fluoride glasses, requires the protection of the preforms and the resulting optical fibers. In conventional optical fibers for telecommunications, the weight of the polymer coating is roughly the same as the weight of the fiber itself. For space manufacturing, the processing of the fiber in space that includes a primary coating. The primary coating represents a fraction of the infrared glass material weight, for example less than half of the infrared glass preform weight. The optical fiber that is fabricated in space can then be coated with a secondary coating upon the return to Earth. This secondary coating could be applied over the primary coating.

In some embodiments, the primary coating can be removed before the secondary coating application. The protection of the fiber can be achieved through the coating of the preform with the polymer material that is similar in softening temperature to the fiber preform. Such material could be Teflon polymer coating. The fiber draw happens together with the coating draw in space, resulting in Teflon coated optical fiber. Preferably the softening temperature of the coating should be less than the softening temperature of the glass. Alternatively, the low loss infrared material preform could be coated with the glass material with similar softening temperature. The advantage of using the glass layer protection is that the glass layer provides better environmental protection compared to the polymer coating.

Example Implementations
Remote Energy Delivery System

An optical fiber can be used as a medium for delivery of high laser energy over great distances. With the dropping costs of the fiber-based lasers, the use of the fiber energy delivery becomes an attractive solution for a number of applications from powering the remote installations to remote material processing including rock drilling and pipe perforation for energy industry or airframe integration for missile defense or other purposes.

The challenges of the existing fiber materials based on fused silica include the limited operating wavelength of approximately 1.6 microns and fiber reach of approximately 5 km. The nonlinear effects and the insertion loss in the fiber can limit the effective length and the maximum power of such systems.

Optical fiber energy delivery is also used for remote optical sensing and provides the benefit of the remote monitoring of structures over the great distances:

There is a promising solution for energy delivery through the fibers with voids such as high-power infrared light delivery through a hollow core photonic band gap fibers. The presence of the interfaces of fiber glass and the void in the optical path of such fibers however is a serious problem for high power delivery. The material defects of the interface can degrade and create additional loss that will result in failed transmission.

The optical fiber described herein describes optical fiber materials and manufacturing techniques for energy delivery. The fibers containing halogen elements have the promise of insertion loss as low as 1 dB per 1000 km.

Such fibers based for example on fluoride glasses provide the longer operating length for the energy delivery system. The operating wavelength of the new fibers is longer than 1.7 microns and preferably is in the range of 2.0 to 6.5 microns. The reduced nonlinear effects and the promise of lower insertion loss represent a unique opportunity to extend the length of the energy delivery and increase the delivered optical power. Suppression of loss-creating effects in the low gravity environment represents a unique opportunity to address the need with low loss optical fibers made in a low obit platform.

The typical insertion loss for silica based optical fiber for power delivery is 0.2 dB per km. With acceptable power loss of 1 dB (~20%) the delivery range for such optical fibers is 5 km at the operating wavelength around 1.5 microns.

The lower loss fibers described herein, such as fluoride based fibers, have can demonstrate insertion loss reduction down to the level of 0.02 dB per km or less at the operating wavelengths longer than 1.7 microns. The resulting operating distance for such low loss fiber system with 1 dB acceptable loss is increased beyond 10 km. The delivery of the light with longer wavelength provides additional benefits in the energy utilization due to higher absorption of the materials in the wavelength range from 1.7 microns to 6.5 microns. An example of such enhanced absorption is the absorption of water that is widely presented in a range of materials and rocks at the wavelength range around 3 microns.

FIG. 7A is a schematic diagram of an example energy delivery system in accordance with embodiments of the present disclosure. FIG. 7A illustrates an example oilfield application 700 for down well energy delivery using a fiber 702 as described herein. The oilfield application can include a well that can be several kilometers deep. The optical fiber 702 can be 1-10 km, provide 1-100 kW of power, and operate at an emission wavelength between around 2-4 microns. The fiber 702 includes a low insertion loss (e.g., 0.02 db/km or less at ▯▯▯▯▯ . A laser source 704 can emit laser light through the fiber 702, which can deliver the optical energy of the laser down well at emitters 706.

Figure 7B:
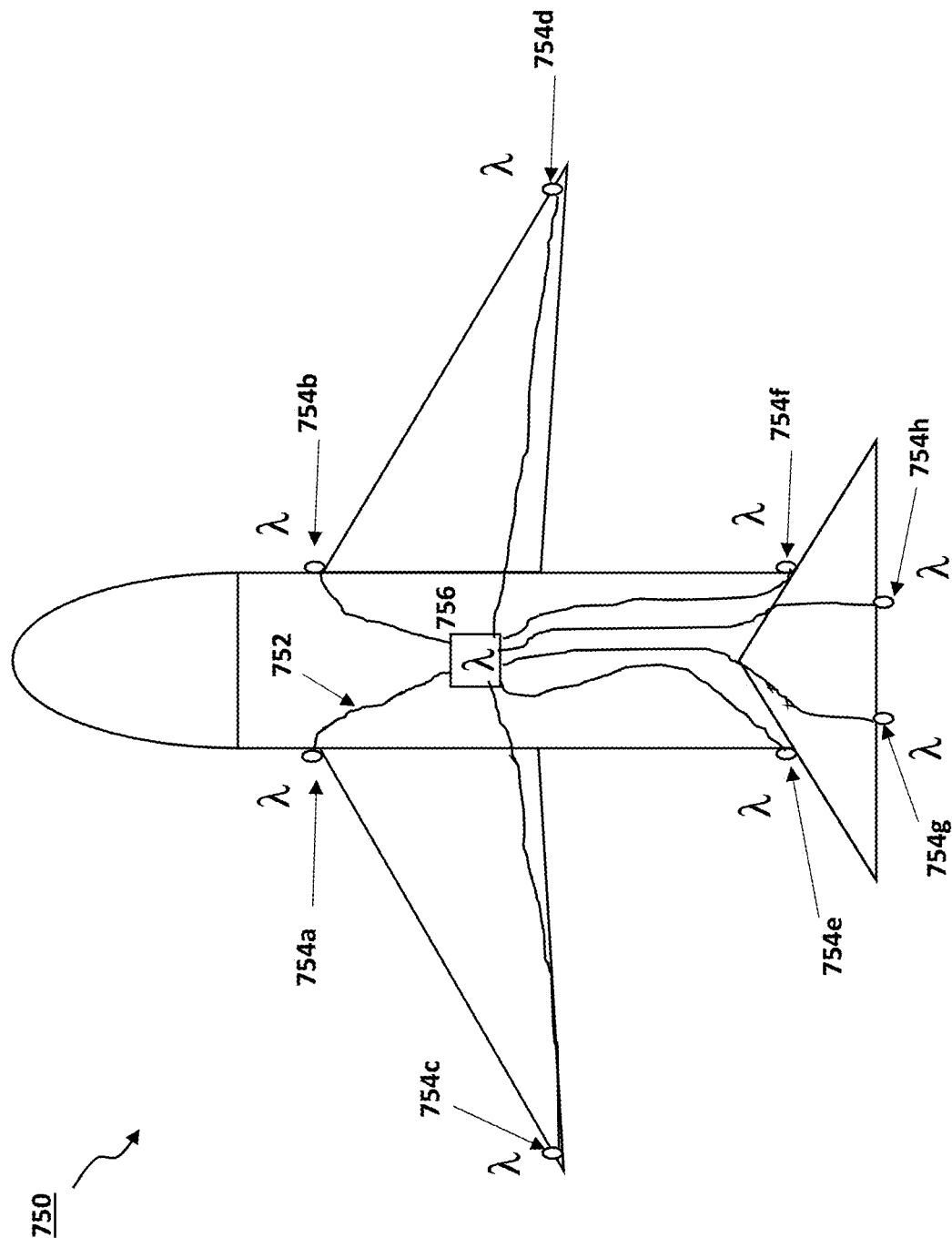
FIG. 7B is a schematic diagram of another example energy delivery system in accordance with embodiments of the present disclosure.

FIG. 7B is a schematic diagram of another example energy delivery system in accordance with embodiments of the present disclosure. FIG. 7B illustrates an example airframe 750. Aircraft can use multiple emitting apertures to emit high energy light to, e.g., blind incoming missiles. Airframe 750 is illustrated as an airplane, but other types of airframes are contemplated, such as those use for drones, helicopters, missiles, or other types of airframes. The airframe 750 can include a laser source 756 that can emit laser light between 2-7 microns at a power between 1-100 W through one or more fibers 752. Fiber 752 can be similar to that described herein and can be between 10-50 meters, depending on the size of the airframe 750. Fiber 752 can deliver optical energy from the source 756 to one or more emitters 754a-h in different parts of the airframe 750.

Optical Communication System with Longer Operating Wavelength and Wavelength Conversion FIG. 6 is a schematic diagram of a data transmission system 600 using an optical fiber in accordance with embodiments of the present disclosure. The data transmission system 600 includes an optical fiber 602, which can be a fluoride or halogen based optical fiber manufactured in a low-gravity environment, as disclosed here. The data transmission system 600 can also include wavelength conversion units 604a and 604b. The wavelength conversion could be non-linear optical conversion. There is a dramatic growth in the demand for fiber optic bandwidth that is driven by the growth of data transmission. The upcoming challenge in addressing the capacity scaling for the data transmission is facing the fundamental limitations of existing fibers such as non-linear Shannon limit. Further increases in the data transmission rates require the longer operating wavelength and the lower loss optical fibers.

The fibers produced in a low gravity environment with the promise of insertion loss by more than an order of magnitude over existing optical fibers offer both the reduced insertion loss and the longer operating wavelength with reduced nonlinear effects for the data transmission.

The new low loss fibers represent the opportunity for new optical communication system with wavelength conversion. This system operates at the wavelength range that is longer than the typical wavelength of existing optical communications. The state of the art optical communication systems operate at wavelength range at around 1.5 microns with the typical fiber insertion loss in the range of 0.15 to 0.25 dB per km. The system of the present invention uses wavelength converters to interface the low loss optical fibers with the data transmissions at shorter wavelength. The shorter wavelengths benefit from lower noise and lower cost optical detection and readily available high speed optical transmitters.

All-optical wavelength conversion in optical fibers has the following potential advantages: 1) it eliminates optical-electrical-optical conversion and, thus, enables transparent all-optical networks; 2) it is ultrafast and transparent to both modulation format and bit rate; 3) it induces negligible signal degradation since there is little chirp or added noise; and 4) the optical fiber itself is low cost, low loss, and seamlessly compatible with the transmission fiber.

The operating wavelength for the new low loss fiber is from approximately 1.7 microns to 6.5 microns. The wavelength of the optical signals after the wavelength converters is preferably in the range of 0.7 microns to 1.5 microns to match the existing optical communication systems and low noise receivers.

What is claimed is:

1. A system for delivering optical energy through an optical fiber formed in a low gravity environment, the system comprising:
   a laser source;
   an optical aperture; and
   the optical fiber formed in the low gravity environment coupling the laser source to the optical aperture.

2. The system of claim 1, wherein the optical fiber comprises fluoride.

3. The system of claim 2, wherein the optical fiber comprises ZrF4-BaF2-LaF3-AlF3-NaF (ZBLAN).

4. The system of claim 1, wherein the optical fiber comprises an insertion loss in a range from 13 dB per 1000 km to 120 dB per 1000 km.

5. The system of claim 1, wherein the optical fiber comprises an insertion loss less than or equal to 0.02 dB per km at an operating wavelength longer than 1.7 microns.

6. The system of claim 1, further comprises an airframe, and wherein the optical aperture resides at one or more locations on the airframe.

7. The system of claim 6, wherein the laser source is to emit laser light at a power in a range from 1 watt to 100 watts.

8. The system of claim 6, wherein the laser source is to emit a laser at a wavelength within a range from 1.7 microns to 7 microns through the optical fiber.

9. The system of claim 1, wherein the optical aperture is configured for down-well applications.

10. The system of claim 9, wherein the laser source is to emit laser light at a power in a range from 1 kilowatt to 100 kilowatts.

11. The system of claim 9, wherein the laser source is to emit a laser at a wavelength within a range from 1.7 microns to 4 microns through the optical fiber.

12. The system of claim 1, the system comprising an optical communication system.

13. The system of claim 12, wherein the optical fiber comprises an insertion loss less than or equal to 0.15 dB/km at an operating wavelength in a range from 2-4 microns.

\* \* \* \* \*

UNITED STATES PATENT AND TRADEMARK OFFICE
CERTIFICATE OF CORRECTION

PATENT NO. : 10,550,028 B2
APPLICATION NO. : 16/260040
DATED : February 4, 2020
INVENTOR(S) : Dmitry Starodubov and Leo Volfson Page 1 of 1

It is certified that error appears in the above-identified patent and that said Letters Patent is hereby corrected as shown below:

In the Specification

In Column 9, Line 38, delete "[illegible]" and insert -- $\lambda > 1.7\mu$) --, therefor.

Signed and Sealed this
Twentieth Day of June, 2023

Katherine Kelly Vidal
*Director of the United States Patent and Trademark Office*